US009618986B2

(12) United States Patent
North et al.

(10) Patent No.: US 9,618,986 B2
(45) Date of Patent: Apr. 11, 2017

(54) PARTITIONED AIRFLOW METHOD FOR COOLING INFORMATION HANDLING SYSTEMS

(71) Applicant: Dell Products L.P., Round Rock, TX (US)

(72) Inventors: Travis C. North, Cedar Park, TX (US); Andrew T. Sultenfuss, Leander, TX (US); Christopher M. Helberg, Austin, TX (US); Austin M. Shelnutt, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 172 days.

(21) Appl. No.: 14/591,329

(22) Filed: Jan. 7, 2015

(65) Prior Publication Data

US 2016/0195909 A1    Jul. 7, 2016

(51) Int. Cl.
*G06F 1/16* (2006.01)
*G06F 1/20* (2006.01)

(52) U.S. Cl.
CPC ..................................... *G06F 1/20* (2013.01)

(58) Field of Classification Search
CPC .......... G06F 1/20; G06F 1/1632; G06F 1/203; G06F 1/206

USPC ............. 361/679.41–679.44, 679.48–679.51
See application file for complete search history.

(56) References Cited

U.S. PATENT DOCUMENTS

| 6,837,058 | B1 * | 1/2005 | McEuen | G06F 1/1626 |
| | | | | 361/679.41 |
| 7,679,902 | B2 * | 3/2010 | Thompson | G06F 1/1632 |
| | | | | 361/679.44 |
| 8,164,222 | B2 * | 4/2012 | Baarman | G06F 1/1628 |
| | | | | 190/100 |
| 2005/0162824 | A1 * | 7/2005 | Thompson | G06F 1/1632 |
| | | | | 361/679.41 |

* cited by examiner

*Primary Examiner* — Anthony Haughton
(74) *Attorney, Agent, or Firm* — Terrile, Cannatti, Chambers & Holland, LLP; Stephen A. Terrile

(57) ABSTRACT

A system for supplying cooling airflow across a plurality of wireless charging coils. More specifically in certain embodiments, the system includes a charging system which includes a partitioned airflow system for cooling a plurality of information handling systems. In certain embodiments the information handling systems comprise wireless powered information handling systems. In certain embodiments, the charging system includes a charging system housing as well as a plurality of charging transmit coils. The charging transmit coils interact with respective charging receive coils which are associated with respective information handling systems.

10 Claims, 3 Drawing Sheets

PARTITIONED AIRFLOW METHOD FOR COOLING INFORMATION HANDLING SYSTEMS

BACKGROUND OF THE INVENTION

Field of the Invention

The present invention relates to information handling systems. More specifically, embodiments of the invention relate to a partitioned airflow method for cooling information handling systems such as wireless powered information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One issue that relates to information handling systems, particularly mobile type information handling systems is how to best cool the information handling system. As information handling system trends continue to move toward thinner, lighter, and more powerful systems, there is a need to maximize performance while minimizing form factor. As systems continue to trend thinner and lighter, critical cooling aspects of the system have transitioned from individual components such as system on chip or memory to the system skin becoming a limiting cooling factor.

The issue of cooling can be especially important in devices which use wireless charging as the wireless power transmit and receive coils can generate thermal challenges due to Joule heating. In certain wirelessly charged systems a typical energy loss can be as much as 20 to 40% of the applied charging power. Also, the placement of the transmit and receive coils is often location constrained. The constrained locations may be close to the battery being charged which can create localized hot spots which may degrade the battery life. The constrained locations may also be below display devices which can cause hot spots which may reduce the image quality of the display device. The constrained locations may also be in common touch areas which can increase the temperature of the device potentially causing user discomfort.

Accordingly, it would be desirable to provide a way to improve cooling of the skin while minimizing the form factor of the system.

SUMMARY OF THE INVENTION

A system and method are disclosed for supplying cooling airflow across a plurality of wireless charging coils. More specifically in certain embodiments, the system and method include a charging system which includes a partitioned airflow system for cooling a plurality of information handling systems. In certain embodiments the information handling systems comprise wireless powered information handling systems. In certain embodiments, the charging system includes a charging system housing as well as a plurality of charging transmit coils. The charging transmit coils interact with respective charging receive coils which are associated with respective information handling systems.

In certain embodiments, the partitioned airflow system includes an airflow entry portion via which airflow enters the housing as well as at least one airflow exit portion. In certain embodiments, the airflow exit portion comprises a microporous material. The airflow exit portion is positioned between the transmit coil and the receive coil to provide airflow across a charging information handling system. In certain embodiments, the microporous structure provides airflow impedance to balance airflow across the plurality of transmit and receive coils. Also, in certain embodiments, an airflow generation device such as a fan is included within the charging system housing to positively pressurize airflow within the charging system. The positively pressurized airflow in turn generates a balanced airflow through the microporous structure.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
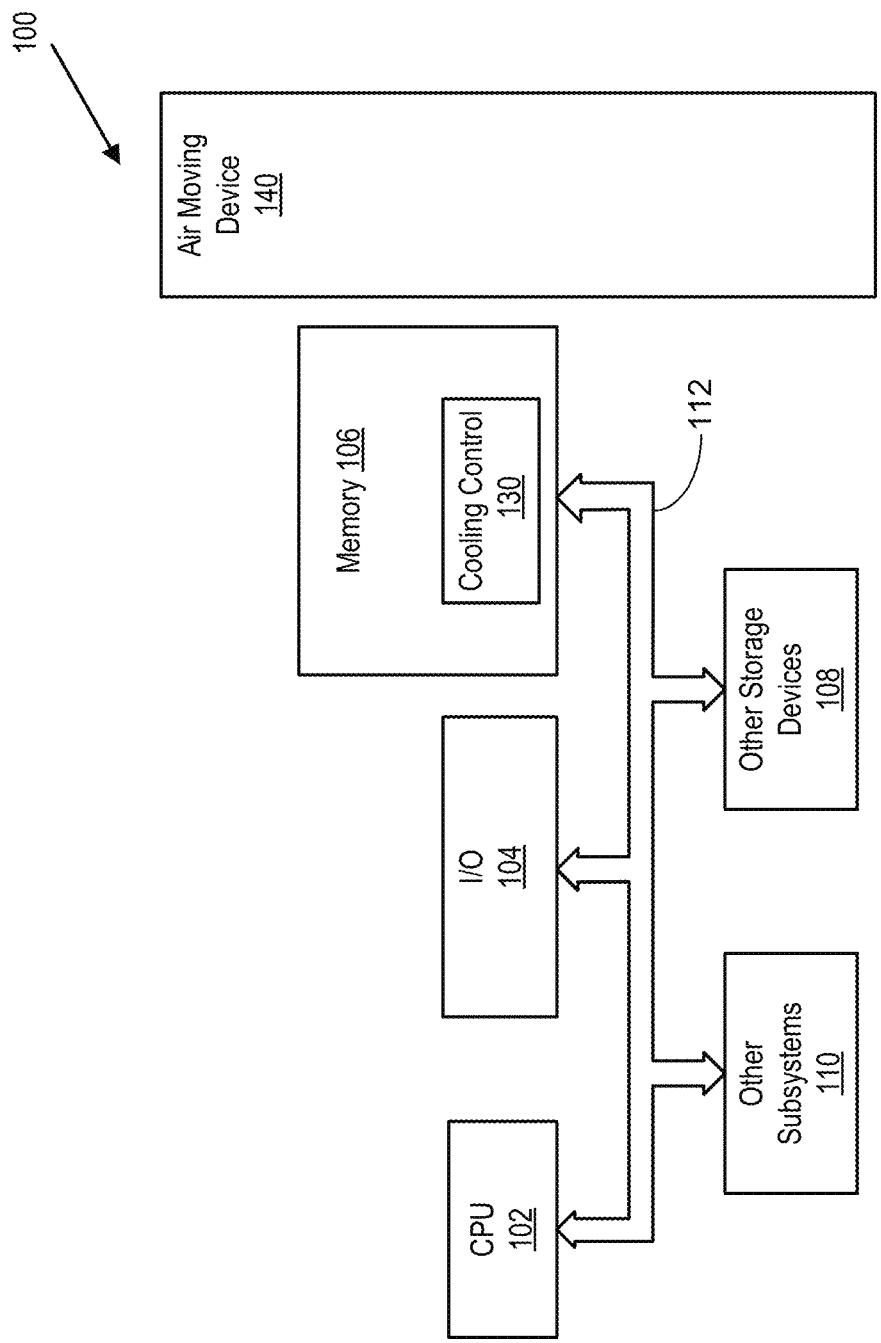
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, memory 106, and various other subsystems 110. The information handling system 100 likewise includes other storage devices 108. The components of the information handling system are interconnected via one or more buses 112.

In certain embodiments, the system 100 further includes a cooling control system 130 stored in the memory 106 which includes instructions executable by the processor 102. Also, in certain embodiments the system further includes at least one air moving device 140. The air moving device 140 improves cooling of the skin (i e, the external surface of the housing) of an information handling system 100.

Figure 2:
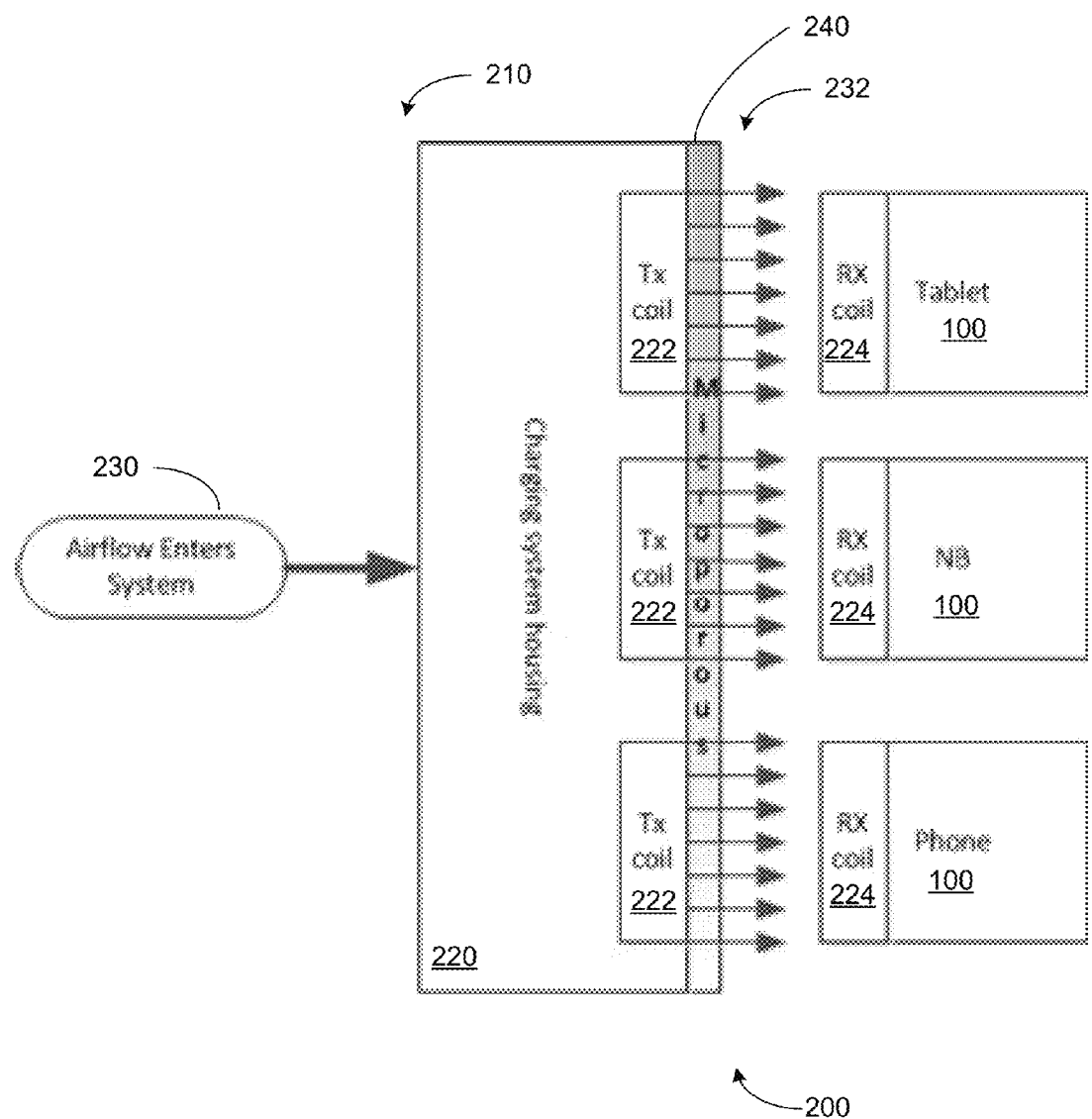
FIG. 2 shows a block diagram of a charging system which includes a partitioned airflow system for cooling information handling systems such as wireless powered information handling systems.

Referring to FIG. 2, a block diagram of a charging system 200 which includes a partitioned airflow system 210 for cooling a plurality of information handling systems 100 such as wireless powered information handling systems is shown. In various embodiments, the information handling systems can include one or more of a table type information handling system, a notebook (NB) type information handling system and a phone (such as a mobile phone) type information handling system. More specifically, the charging system 200 includes a charging system housing 220 as well as a plurality of charging transmit coils 222. The charging transmit coils 222 interact with respective charging receive coils 224 which are associated with respective information handling systems.

The partitioned airflow system 210 includes an airflow entry portion 230 via which airflow enters the housing 220 as well as at least one airflow exit port 232. The airflow exit portion 232 comprises a microporous material 240. The airflow exit portion 232 is positioned between the transmit coil 222 and the receive coil 224 to provide airflow across a charging information handling system 100. By providing airflow through each transmit coil region the local heat transfer coefficient is increased. The partitioned airflow system 210 increases a localized heat transfer coefficient by substantially ten times that of natural convection. The portioned airflow system 210 cools both the transmit coil region as well as the receive coil region and can reduce the skin temperature of a respective information handling system by as much as 30 degrees Celsius.

The microporous structure provides airflow impedance to balance airflow across the plurality of transmit and receive coils. A fan is included within the charging system housing 220 to positively pressurize the charging system 200 which in turn generates a balanced airflow through the microporous structure.

Figure 3:
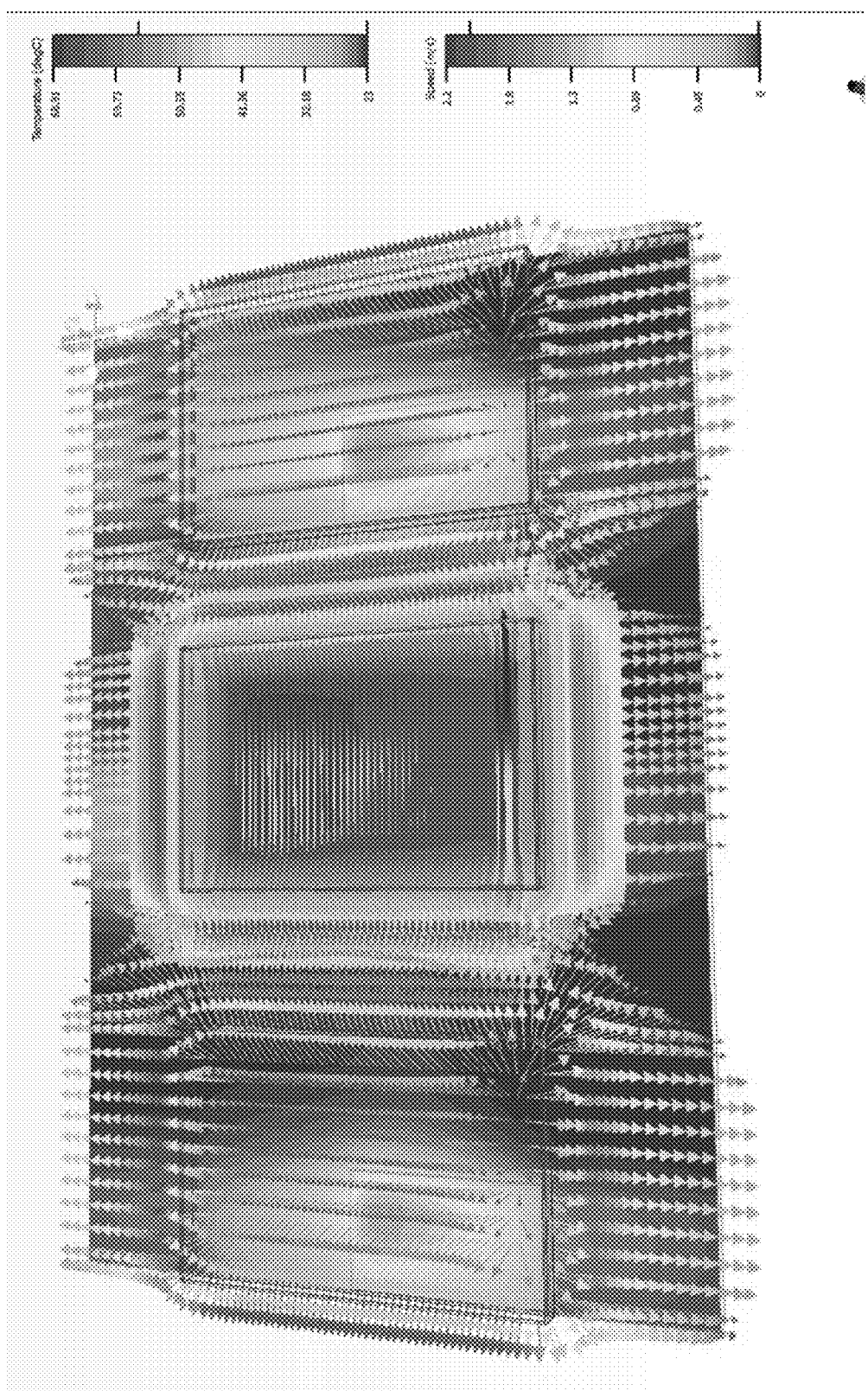
FIG. 3 shows a diagrammatic representation of heat dissipation of a plurality of information handling systems which are charged using a charging system which includes a portioned airflow system.

FIG. 3 shows a diagrammatic representation of heat dissipation of a plurality of information handling systems which are charged using a charging system which includes a portioned airflow system. More specifically, by providing a portioned airflow system within the charging system the information handling systems 100 being charged receive a cooling airflow across the outside of each respective information handling system housing. The airflow provides a cooling function during an operation (e.g., wireless charging of the information handling system) that generates relatively high heat within each information handling system.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A charging system for supplying airflow comprising:
a housing, the housing comprising:
a charging transmit coil, charging transmit coil interacting with a charging receive coil associated with an information handling system, the interacting charging the information handling system;
an airflow system, the airflow system supplying cooling airflow across the charging transmit coil and the charging receive coil; and wherein
the charging system comprises a plurality of charging transmit coils for interacting with a respective plurality of charging receive coils; and,
the airflow system partitions the cooling airflow for cooling a plurality of information handling systems, the cooling airflow being partitioned by providing airflow through a transmit coil region corresponding to each of the plurality of charge transmit coils.

2. The charging system of claim 1, wherein:
the information handling system comprises a wireless powered information handling system.

3. The charging system of claim 1, wherein:
the partitioned airflow system includes an airflow entry portion via which airflow enters the housing and an airflow exit portion; and,
the airflow exit portion is positioned between the transmit coil and the receive coil to provide airflow across the receive coil and a charging information handling system.

4. The charging system of claim 3, wherein:
the airflow exit portion comprises a microporous material, the microporous material providing airflow impedance to balance airflow.

5. The charging system of claim 1, wherein:
the airflow system comprises an airflow generation device, the airflow generation device providing positively pressurized airflow within the housing of the charging system.

6. A system comprising:
a processor;
a data bus coupled to the processor;
a charging receive coil; and,
charging system for supplying airflow across the system, the charging system comprising a housing, the housing comprising a charging transmit coil, charging transmit coil interacting with the charging receive coil, the interacting charging the information handling system, and an airflow system, the airflow system supplying cooling airflow across the charging transmit coil and the charging receive coil; and wherein
the charging system comprises a plurality of charging transmit coils for interacting with a respective plurality of charging receive coils; and, the airflow system partitions the cooling airflow for cooling a plurality of information handling systems, the cooling airflow being partitioned by providing airflow through a transmit coil region corresponding to each of the plurality of charge transmit coils.

7. The system of claim 6, wherein:

the information handling system comprises a wireless powered information handling system.

8. The system of claim 6, wherein:

the partitioned airflow system includes an airflow entry portion via which airflow enters the housing and an airflow exit portion; and, the airflow exit portion is positioned between the transmit coil and the receive coil to provide airflow across the receive coil and the information handling system.

9. The system of claim 8, wherein:

the airflow exit portion comprises a microporous material, the microporous material providing airflow impedance to balance airflow.

10. The system of claim 6, wherein:

the airflow system comprises an airflow generation device, the airflow generation device providing positively pressurized airflow within the housing of the charging system.

* * * * *